US009870676B2

(12) United States Patent
Shoenhair et al.

(10) Patent No.: US 9,870,676 B2
(45) Date of Patent: Jan. 16, 2018

(54) MONEY CARD IN POKER GAME

(71) Applicant: Zynga Inc., San Francisco, CA (US)

(72) Inventors: Thomas Arthur Shoenhair, Lafayette, CA (US); Bradley James Harrison, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 621 days.

(21) Appl. No.: 14/306,091

(22) Filed: Jun. 16, 2014

(65) Prior Publication Data

US 2015/0364013 A1 Dec. 17, 2015

(51) Int. Cl.
*A63F 13/00* (2014.01)
*G07F 17/32* (2006.01)

(52) U.S. Cl.
CPC ...... *G07F 17/3293* (2013.01); *G07F 17/3244* (2013.01)

(58) Field of Classification Search
USPC ...................................................... 463/25–42
See application file for complete search history.

(56) References Cited

U.S. PATENT DOCUMENTS 5,755,621 A 5/1998 Marks et al. .................. 463/42
5,833,540 A 11/1998 Miodunski et al. ............ 463/42
5,971,849 A * 10/1999 Falciglia ............ G07F 17/3293 273/292
6,039,648 A 3/2000 Guinn et al. .................... 463/16
6,077,162 A 6/2000 Weiss .............................. 463/26
6,450,500 B1 * 9/2002 Miller ................ A63F 3/00157 273/292
7,066,465 B2 6/2006 Daines .......................... 273/292
7,255,351 B2 * 8/2007 Yoseloff ................. G07F 17/32 273/274
8,459,650 B2 * 6/2013 Baseel ............... A63F 3/00157 273/274
8,727,850 B2 5/2014 Burnside et al. .............. 463/13
2002/0045474 A1 4/2002 Singer et al. .................. 463/20
2003/0222400 A1 * 12/2003 Collins .............. A63F 3/00157 273/274
2005/0054446 A1 3/2005 Kammier et al. .............. 463/42
2005/0253338 A1 * 11/2005 Daines ............... A63F 3/00157 273/292
2011/0095480 A1 * 4/2011 Berman ................. G07F 17/32 273/292

(Continued)

*Primary Examiner* — Masud Ahmed
(74) *Attorney, Agent, or Firm* — Martine Penilla Group, LLP

(57) ABSTRACT

Methods, and computer programs are provided for games with an additional chance for a fee. One method includes operations for providing an interface for playing a game, and executing game operations to determine the outcome of the game, where the outcome includes a combination obtained by the player. Additionally, the method includes operations for determining if the combination is eligible for allowing the player to improve, and for ending the betting game when the combination is ineligible for improvement. The option to improve is provided when the combination is eligible to improve the combination. In one example, the game is a video poker game, and a money card is offered to the player if the player could improve the hand to a straight or better. If the player selects the money card, a fee is charged that does not increase the bet of the player for the hand being played.

19 Claims, 10 Drawing Sheets

(56) References Cited

U.S. PATENT DOCUMENTS

| | | | | |
|---|---|---|---|---|
| 2011/0165926 | A1* | 7/2011 | Hall | G07F 17/32 463/13 |
| 2011/0201398 | A1* | 8/2011 | Parham | G07F 17/32 463/13 |
| 2012/0074647 | A1 | 3/2012 | Hall | 273/274 |
| 2013/0072275 | A1* | 3/2013 | Brien | G07F 17/3293 463/13 |
| 2013/0237303 | A1* | 9/2013 | Berman | G07F 17/3293 463/13 |
| 2015/0080076 | A1* | 3/2015 | Snow | A63F 3/00157 463/11 |

* cited by examiner

Fig. 2B
Fig. 2C
JACKS OR BETTER
427,737
8
Get Chips & Gold
Redeem
Level 39
Pro
VIP
CHIPS PLAYED 1x 2x 3x 4x 5x
ROYAL FL
STRAIGHT
FOUR OF
FULL HOU
FLUSH
STRAIGHT 4,000 8,000 12,000 16,000 20,000
3 OF A KIND 3,000 6,000 9,000 12,000 15,000
TV 2,000 4,000 6 8,000 10,000
JA BETTER 1,000 2,000 3 4,000 5,000
4,000,000
250,000
125,000
45,000
30,000
Go Bigger – Money Card!
212
214
MONEY CARD SELECTED
BET
1,000
CANCEL
BUY CARD
1,000
108
110
216
112
218
220
JACKS OR BETTER
430,737
8
Get Chips & Gold
Redeem
Level 39
Pro
VIP
CHIPS PLAYED 1x 2x 3x 4x 5x
ROYAL FL
STRAIGHT
FOUR OF
FULL HOU
FLUSH
STRAIGHT 4,000 8,000 12,000 16,000 20,000
3 OF A KIND 3,000 6,000 9,000 12,000 15,000
TWO PAIR 2,000 4,000 6,000 8,000 10,000
JACKS OR BETTER 1,000 2,000 3,000 4,000 5,000
4,000,000
250,000
125,000
45,000
30,000
You Win!
3,000
232
BET
1,000
BET ONE
BET MAX
CHIPS WON
118 3,000
DEAL
104
108
110

Fig. 3C
JACKS OR BETTER
104
673,737
8
Get Chips & Gold
Redeem
Level 39
Pro
VIP
CHIPS PLAYED 1x 2x 3x 4x 5x
ROYAL FLUSH 250,000 500,000 750,000 1,000,000 4,000,000
STRAIGHT FLUSH 50,000 100,000 150,000 200,000 250,000
FOUR OF A KIND 25,000 50,000 75,000 100,000 125,000
108
FULL HOUS 45,000
FLUSH 30,000
STRAIGHT 20,000
3 OF A KIN 15,000
TWO PAIR 10,000
JACKS OR BETTER 1,000 2,000 3,000 4,000 5,000
You Win!
232
250,000
110
BET 5,000
BET ONE
BET MAX
CHIPS WON
118 250,000
DEAL

MONEY CARD IN POKER GAME

BACKGROUND

1. Field of the Invention

The present embodiments relate to methods for providing an online game, and more particularly, methods, systems, and computer programs for providing an online game with different betting options.

2. Description of the Related Art

Online betting games have become very popular, including casino-style games, such as video slots, online poker, video poker, blackjack, etc. In order to make games more interesting, game providers try to offer alternatives within the game to increase their variability, challenges, and bonus games.

However, many of the online games simply simulate game experience of a player played in a casino, which makes these online games similar with little differentiation from each other, resulting in a lack of customer loyalty.

Increasing the options available to a player in the game improves customer experience, which results in longer playing periods of engagement. Also, by improving customer experience, game providers may entice new players to play the game. Further, by providing additional game options, players may increase their bet amounts which may result in increasing purchases of game currency.

Game options are desired that improve customer satisfaction with the game. It is in this context that embodiments arise.

SUMMARY

Methods, devices, systems, and computer programs are presented for providing games with an additional winning chance for a fee. It should be appreciated that the present embodiments can be implemented in numerous ways, such as a method, an apparatus, a system, a device, or a computer program on a computer readable medium. Several embodiments are described below.

In one embodiment, a method includes operations for providing an interface to a player for playing a betting game, and for executing game operations to determine an outcome of the betting game. The outcome includes a combination obtained by the player after executing the game operations. Additionally, the method includes operations for determining if the combination is eligible for providing the player an option to improve the combination, and for ending the betting game when the combination is ineligible to improve the combination. The option to improve is provided when the combination is eligible to improve the combination. In one embodiment, the operations of the method are executed by a processor.

In another embodiment, a method includes operations for providing an interface to a player for playing a video poker game, dealing cards, and providing an option to keep or discard each card. New cards are dealt to replace each discarded card to obtain a card combination with the kept cards and the new cards. Additionally, the method includes operations for determining if the card combination is eligible for providing the player an option to improve the card combination, and for ending the video poker game when the card combination is ineligible to improve the card combination. In addition, the method includes an operation for providing the option to improve when the card combination is eligible. In one embodiment, the operations of the method are executed by a processor.

In yet another embodiment, a non-transitory computer-readable storage medium stores a computer program, the computer-readable storage medium including program instructions for providing an interface to a player for playing a betting game, and program instructions for executing game operations to determine an outcome of the betting game. The outcome includes a combination obtained by the player after executing the game operations. Additionally, the storage medium includes program instructions for determining if the combination is eligible for providing the player an option to improve the combination, and program instructions for ending the betting game when the combination is ineligible to improve the combination. The storage medium further includes program instructions for providing the option to improve when the combination is eligible to improve the combination.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for providing games with an additional winning chance for a fee. It will be apparent, that the present embodiments may be practiced without some or all of these specific details. In other instances, well-known process operations have not been described in detail in order not to unnecessarily obscure the present embodiments.

An option is provided in a video poker game to get an extra card to improve the player's hand. The card is referred to herein as the "money card" and the goal of the money card is to give the player another chance to receive a winning hand. In one embodiment, the money card is offered in a video poker game, which is a variant of 5-card draw, in which the player can, at the end of standard play, pay chips to purchase an option for discarding and replacing an existing card.

Figure 1:
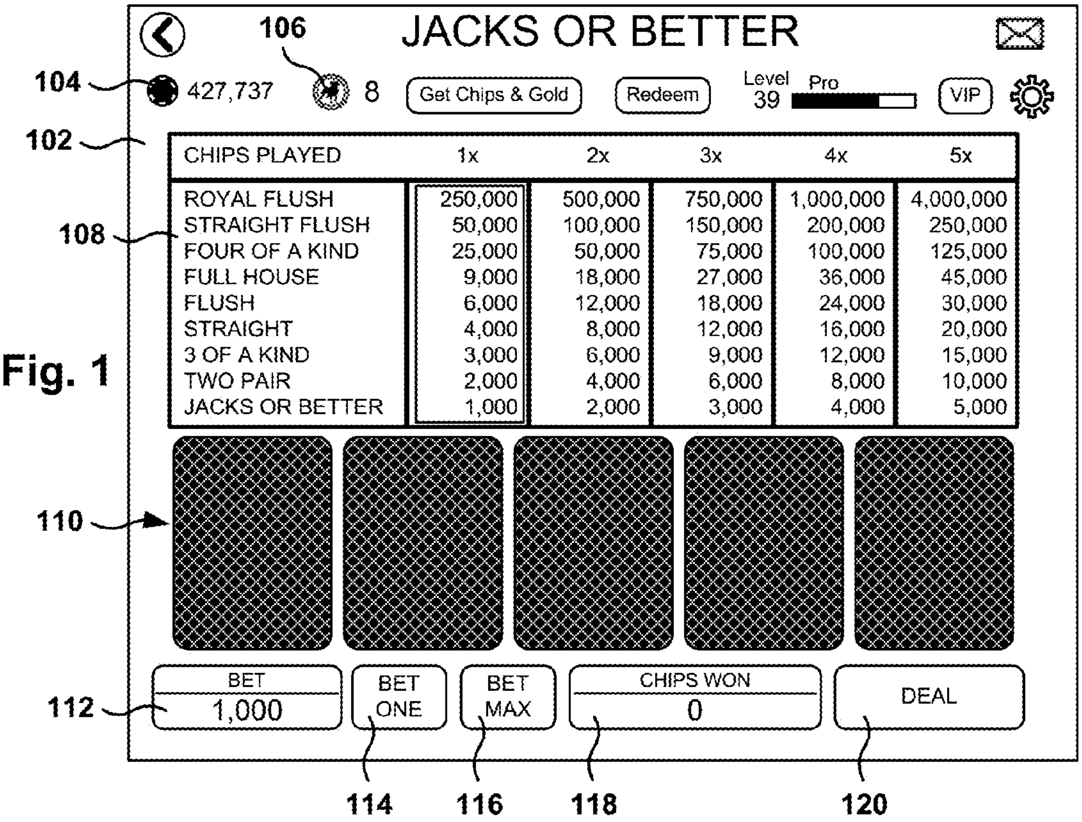
FIG. 1 depicts an interface for playing a video poker game, according to one embodiment.

FIG. 1 depicts an interface for playing a video poker game, according to one embodiment. Interface 102 illustrates the interface for playing Jacks-or-Better video poker. In one embodiment, the Jacks-or-Better game includes dealing five cards 110, waiting for the player to select which of the five cards the player wishes to keep (e.g., Hold), and then dealing new cards, if any, for those cards that have not been put on hold. After the second deal, the game determines if the player has won by checking the player's cards against payout table 108.

To initiate the hand, the player selects how much to bet by selecting button 114 or by selecting button 116. In one embodiment, the maximum bet is 5,000 units, and the current bet 112 is the total bet for this hand. Every time the player selects the "bet one" button 114 the bet is increased by 1,000, up to the maximum of 5,000. If the player selects the "bet max" button 116 then the current bet 112 is set to the maximum bet of 5,000 units.

Currency counter 104 indicates how much game currency (e.g., chips, coins, real money, virtual money, etc.) the user has in the user's account. The currency counter 104 is also referred to as the player's bank. For description purposes, the game currency is described herein as units, which may represent virtual currency or real-money currency, or any combination thereof. In one embodiment, a second currency 106 is also provided. The second currency may be used to buy other game related items, such as more chips, shortcuts in the game, game hints, etc.

Embodiments are presented herein with reference to a video poker game of Jacks Or Better, but the same or similar principles apply to other kinds of video poker games, such as Kings or Better, Deuces Wild, etc. Further, the principles presented herein may be applied to any betting game or game of chance where the outcome of the game may be improved, such as Jacks or Better Video poker, Kings or Better video poker, Deuces Wild video poker, Texas Hold'em video poker, Joker Wild video poker, Tens or Better video poker, Caribbean stud poker, Hi-Lo, Black Jack, Roulette, Slots, Craps, or Pachinko. Further, besides casino games, the betting games may be other types of games such as skill games, trivia games, shooting games, fighting games, etc.

The embodiments presented may be applied to real-life money gambling only when their implementation, all or in part, follow the pertinent rules and regulations for real-money gambling. Further, in one embodiment, the game includes a random number generator, and for real-money gambling, the random number generator follows the prescribed rules and regulations. In addition, for real-money gambling, certain features may be adjusted or modified to follow the prescribed rules and regulations.

It is noted that the embodiments presented herein may be implemented in any computing platform having a display. For example, the game may be played on a personal computer, a tablet, a smart phone, a mobile device, a slots machine, etc. In addition, the inputs for playing the game may be entered via keyboard, buttons, mouse, touchscreen touches, gestures, voice, etc. In addition, the embodiments presented herein may also be utilized for real-life games.

The payout table 108 lists the winnings for all the winning hands. In one embodiment, the payout table includes columns for the different possible levels of betting. In the embodiment of FIG. 1, five possible bets are allowed: 1000, 2000, 3000, 4000, or 5000. Each column provides the winnings for the final hand of the player based on the bet entered. It is noted that payout table 108 is exemplary, and other games may have different winning combinations, different payouts, or show a different number of columns (e.g., in one embodiment only a single column is presented that provides the possible winning for the current bet). For each hand, the payout in number of units is presented (e.g., four of a kind pays 25,000 for a bet of 1,000).

After the player selects deal button 120, five cards 110 are dealt.

Figure 2A:
FIG. 2A illustrates the video poker game after dealing cards, according to one embodiment.

FIG. 2A illustrates the video poker game after dealing cards, according to one embodiment. After the cards are dealt, the player can select any of the five cards to hold, but no cards have to be held. The player may hold all the cards, one card, some cards, or no card at all. Message 202 provides a hint to the player to entering the selection for which cards to hold. In one embodiment, each card can be placed on hold (i.e., held) 204 by clicking or selecting the card. Every time the player clicks on a card, the hold status of the car changes, so if the card is selected a second time, the hold is removed.

In one embodiment, if the player has a winning combination, the cards that form the winning combination are highlighted to assist the player in making a determination of what is the best way to improve, and to avoid having the player throw away a winning hand by accident. In the embodiment of FIG. 2A, no cards are highlighted because the player does not have a winning combination.

Once the player selects draw button 120, the cards not held are replaced with new cards and the held cards remain to complete the hand. In the exemplary embodiment of FIG. 2A, the player has decided to hold a pair of nines hoping to get two pairs, three of a kind, a full house, or four of a kind.

Figure 2B:
FIG. 2B illustrates the offering of the money card to the player, according to one embodiment.

FIG. 2B illustrates the offering of the money card to the player, according to one embodiment. In one embodiment, the money card may only be offered if the player is one card away from receiving a straight or above (see payout table 108). In one embodiment, the player can only select one card to be replaced, although more than one card may be offered to become the money card in a single instance. For example, in FIG. 2B the 10 of hearts and the eight of diamonds may be the money cards because they can improve the hand to a full house or a poker. However, if any of the nines where replaced, the user could not get a straight or better, so the nines are not candidates for the money card.

In one embodiment, the cost to buy the money card is equal to the player's bet, but in other embodiments, different pay schemes for the money card are also possible. For example, the money card may be 10%, or 50%, or twice the cost of the current bet, etc. Embodiments may be implemented using any type of fee structure for the money card.

It is noted that, in one embodiment, the purchase of the money card is a payment and not an additional bet. In other words, the price paid for the money card does not change the current bet. The money-card payment goes directly to the house without increasing the player's bet.

The game determines if the player is eligible to play the money card by establishing if, after the draw, the player is one card away from a straight or better. As used herein, the straight is referred to herein as the threshold combination, because to be eligible to play the money card, the player must be able to obtain the threshold combination by exchanging one of the cards. In other embodiments, the threshold combination may be other than the straight. For example, the threshold combination may be a flush or above, or the threshold combination may be 3 of a kind or above, etc.

The cards that can be replaced are identified for the player to choose and, in one embodiment, the card furthest to the left is automatically selected 216. In the embodiment of FIG. 2B, the cards eligible to be played for the money card are identified with an icon 214 next to them, such as an arrow. Other embodiments may utilize other ways of identifying the potential money cards, such as changing the color of the card, highlighting it, putting a border around it, etc.

In the embodiment of FIG. 2B, the player's hand includes three nines, and since the player can obtain a full house or four of a kind by replacing one card, the player is eligible for the money card.

Message 212 invites the player to play the money card to improve the potential winnings. If the player wants another card selected, the player must select that card before purchase. The player can also choose to decline to purchase a money card by selecting cancel button 218, and proceed with the current hand, which means getting paid if the hand is a winning hand.

If the player selects the buy-card button 220, the purchase of the money card is completed and a new card is dealt to replace the selected money card. In this embodiment, the player has selected to replace the ten of hearts.

Figure 2C:
FIG. 2C illustrates the outcome of the video poker game after dealing the money card, according to one embodiment.

FIG. 2C illustrates the outcome of the video poker game after dealing the money card, according to one embodiment. The money card (e.g., the ten of hearts) has been replaced with the king of hearts. Therefore, the player still has three nines and the hand has not improved. The current hand with the new card is now judged against paytable 108.

Message 232 informs the player that the player has won 3,000 units because the player has three of a kind. In one embodiment, the cards forming the winning combination are highlighted (e.g., the three cards forming three of a kind, two cards forming a pair, four cards forming two pairs, etc.). In one embodiment, the winning combination in the payout table 108 is highlighted (e.g., framed, changed color, etc.)

Since the player has won 3,000 units, currency counter 104 has been increased by the same amount. At the end of the hand, the player can play a game at the same-bet level by pressing deal button 120, or the player can change his bet before playing another hand.

It is noted that other embodiments may have different ways to play the money card. For example, in one embodiment, the player may buy more than one money card before being dealt new cards. For example, the player may request two money cards (e.g., the 10 of hearts and the 8 of diamonds) in order to improve the chances of getting the fourth nine. Each of the money cards may have the same cost, or the cost of additional money cards make increase or decrease according to the rules of the game. For example, the first money card may cost 1000 units, while the second money card may cost 2000 units.

In other embodiments, the money card may be played more than once. For example, if the player does not improve with the money card, the player may be given the option of playing the money card again. In some embodiments, the money card always has the same cost, but in other embodiments the cost of the money card increases as the number of money cards played increases (e.g., the cost for the money card may be 1000, 2000, 4000, etc.). However, in some embodiments the number of times the money card may be played is limited, while in other embodiments the player may continue playing the money card until the player decides to stop or runs out of cards. However, in one embodiment, playing the money card multiple times may prove to be expensive for the player, because the cost of the money card increases in order to not give the player overwhelming odds to beat the game.

Figure 3A:
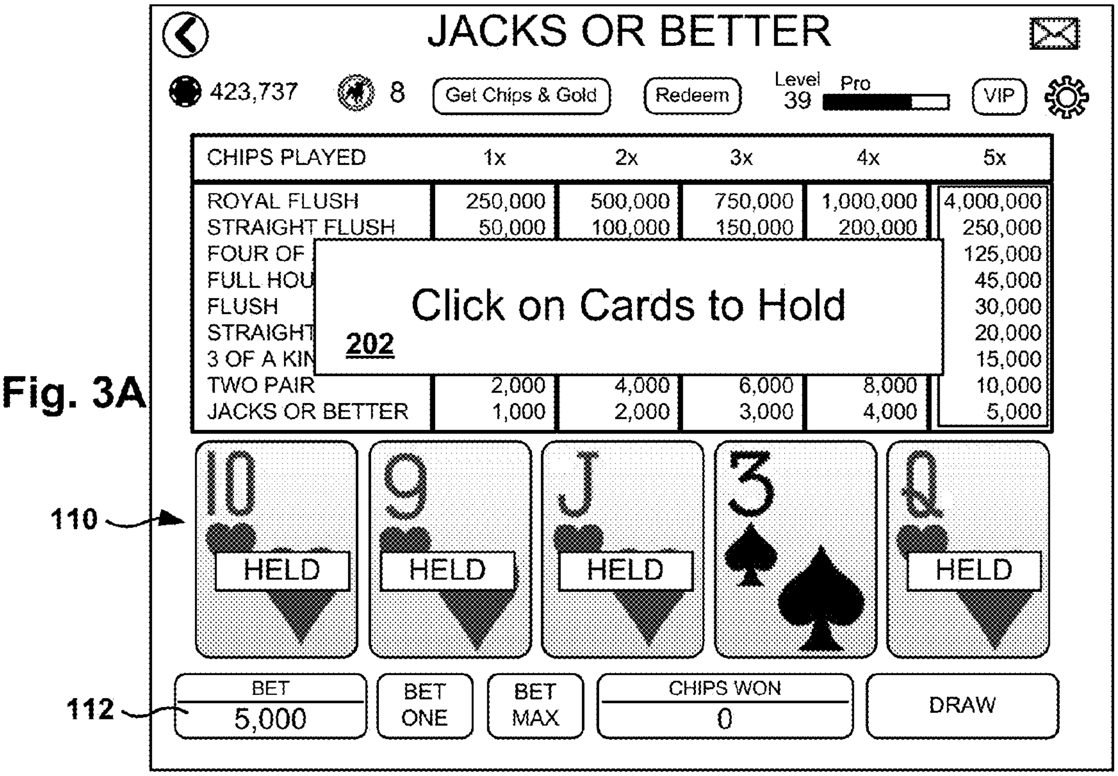
FIG. 3A illustrates another video poker game after dealing cards, according to one embodiment.

FIG. 3A illustrates another video poker game after dealing cards, according to one embodiment. In this embodiment, the player has 10, 9, Jack, and Queen of hearts, plus a 3 of spades. In this embodiment, the player has bet the maximum amount of 5000 units, so the winnings will be determined by the last column of the payout table.

The player has opted to hold the 10, 9, Jack, and Queen of hearts with the hope of getting a straight, a flush, or a straight flush. The player then selects the draw button to get a new deal for one card to replace the 3 of spades.

Figure 3B:
FIG. 3B illustrates the offering of the money card to the player, according to one embodiment.

FIG. 3B illustrates the offering of the money card to the player, according to one embodiment. The player has made a straight, which pays 20,000 units for a bet of 5000 units. In this embodiment, since the player may still improve to something better than a straight, the player is eligible to play the money card. The player may improve to a flush, or to a straight flush, or even get a new straight with a different 8. Of course, if the player takes the risk to play the money card, the player may lose the straight and the 20,000 units that come with it.

In another embodiment, once the player makes the threshold combination, the player is not given the option to play the money card, but in other embodiments, if the player can still improve, the player is still given the chance to play the money card.

In the embodiment of FIG. 3B, the player already has won 20,000 units, but if the player gets the 8 or King of hearts instead of the ace of spades, the player would win 250,000 units for a straight flush. Therefore, there is a high potential for improving the hand (from 25,000 to 250,000 units). In this case, the player has elected the option to play the money card looking for the improvement.

As previously discussed, the cost for the money card may be equal to the cost of the bet, but in other embodiments the cost of the money card may vary according to different factors. For example, in one embodiment, the cost of the money card is directly related to the possible winnings for the player. For example, in this case the player could greatly improve the hand by getting a flush (30,000 units) or a straight flush (250,000 units). In addition, the odds of making the flush are approximately 7 out of 46 (with the 2, 3, 4, 5, 6, 7, or Ace of hearts), the odds of making the straight flush is 2 out of 46 (8 or King of hearts). Since the potential improvement from the player is rather large, the cost of the money card may be increased to reflect the high potential for improvement. For example, in one embodiment, the cost of the money card is doubled when the expected return for playing the money card exceeds a certain threshold return predetermined in the game.

Figure 3C:
FIG. 3C illustrates the outcome of the second video poker game after dealing the money card, according to one embodiment.

FIG. 3C illustrates the outcome of the second video poker game after dealing the money card, according to one embodiment. A new card is dealt to replace the ace of spades, and the new card is the 8 of hearts, which results in a straight flush to the Queen. Message 232 indicates that the player has won 250,000 units. All the cards in the hand are highlighted because all the cards are used in the winning combination.

Chips-won field 118 also indicates that the player has won 250,000 units. The winnings have been added to the currency counter 104 of the user account.

In another embodiment, the parameters of the game regarding payback to the player are adjusted to accommodate for the potential increases in payout due to playing the money card. For example, the payout table may be changed in all the lines, or in some of the lines. For example, there can be a decrease of 10 to 50% in the payout for the top five winning combinations, in order to keep the payout at a desired overall payout level.

Further, in another embodiment, playing the money card also increases the bet. For example, if the bet is 5000 units on the cost of the money card is 10,000 units, 5000 units of the 10,000 are added to the bet resulting in a new bet of 10,000 units. The other 5000 units are a fee and go directly to the house. By increasing the bet, the player also increases the amount of the potential payout, which makes playing the money card even more attractive.

In another embodiment, the video poker game is a Kings or better game. Table 1 below describes the payout for a 1 unit bet and includes an additional column identifying which potential hands (e.g., by replacing one of the cards with a card that makes a winning combination) are eligible for presenting the option of the money card to the player.

TABLE 1

| Hand | Payout | Money-Card Eligible? |
|---|---|---|
| Royal Flush | 800 | Y |
| Straight Flush | 50 | Y |
| 4 of a Kind | 25 | Y |
| Full House | 9 | Y |
| Flush | 6 | Y |
| Straight | 4 | Y |
| 3 of a Kind | 3 | N |
| Two Pair | 2 | N |
| Kings or Better | 1 | N |
| Nothing | 0 | N |

As in some of the previous examples, the money card is not offered on low-payout hands. A player must be a single card away from completing a straight or better. It is noted that in games with wildcards, the payout table, or the cost of the money card, or both, may have to be adjusted in order to keep the expected overall payout at a desired level, because the existence of the wildcard makes the money card more valuable to the player.

Further, in some embodiments, the option to play the money card is always presented to the user, independently of the potential payout for playing the money card.

It is noted that the embodiments illustrated in FIGS. 1, 2A-2C, and 3A-3C exemplary. Other embodiments may utilize different layouts, different games, different payout tables, different rules for providing the money card, different costs for the money card, different number of money cards that can be played in one hand, etc. The embodiments illustrated in FIGS. 1, 2A-2C, and 3A-3C should therefore not be interpreted to be exclusive or limiting, but rather exemplary or illustrative.

Figure 4:
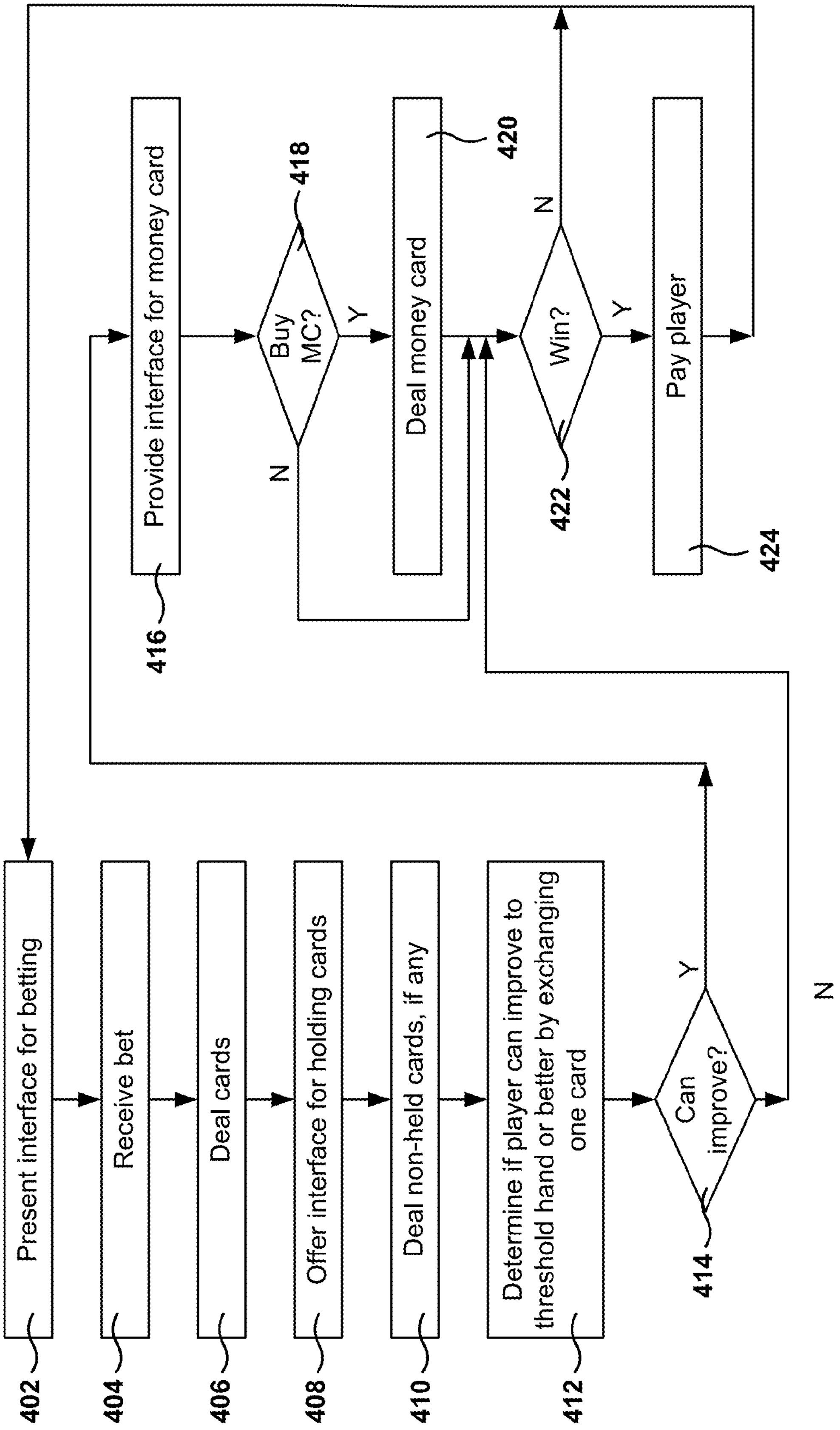
FIG. 4 is a flowchart illustrating an algorithm for providing a money-card option, according to one embodiment.

FIG. 4 is a flowchart illustrating an algorithm for providing a money-card option, according to one embodiment. While the various operations in this flowchart are presented and described sequentially, one of ordinary skill will appreciate that some or all of the operations may be executed in a different order, be combined or omitted, or be executed in parallel.

In operation 402 a graphical user interface (GUI) is presented to the user (see for example FIG. 1). From operation 402, the method flows to operation 404 where the bet entered by the user in the GUI is received (see for example buttons 114 and 116 in FIG. 1 for entering the bet amount).

After the bet is received, cards are dealt in operation 406, and from operation 406 the method flows to operation 408, where the interface provides options for holding any of the dealt cards. From operation 408, the method flows to operation 410 where new cards are dealt, if any, to replace the cards that were not placed on hold.

From operation 410, the method flows to operation 412 where a determination is made to identify if the player can improve the hand to obtain a threshold hand, or better, by exchanging one of the cards for any card that would make that threshold hand or better. In one embodiment, the game is Jacks-or-better video poker, and the threshold hand is a straight. Therefore, the player is eligible to play the money card if the player can make, by replacing one card, a straight, a flush, a full house, four of a kind, a straight flush, or a royal flush. More details on several embodiments for performing operation 412 are provided below with reference to FIGS. 5 and 6.

From operation 412, the method flows to operation 414 where the determination of operation 412 is checked to see if the player can improve. If the player can improve the method flows to operation 416, and if the player cannot improve the method flows to operation 422.

In operation 416 an interface is provided for playing the money card (see for example FIGS. 2B and 3B). From operation 416, the method flows to operation 418, and if the player buys the money card then the method flows to operation 420, but if the player does not buy the money card the method flows to operation 422.

In operation 420, the money card is dealt, which means that the card selected as the money card is replaced with a new card (see for example FIGS. 2C and 3C).

In operation 422, a check is made to determine if the player has a winning hand, i.e., a hand that pays to the player based on the payout table. If the player has a winning hand, the method flows to operation 424 where the corresponding winnings are paid to the player by increasing the currency counter of the player's account. If the player does not have a winning hand, then the method flows back to operation 402. Also, after paying the player, the method flows back to operation 402 to start a new hand.

Figure 5:
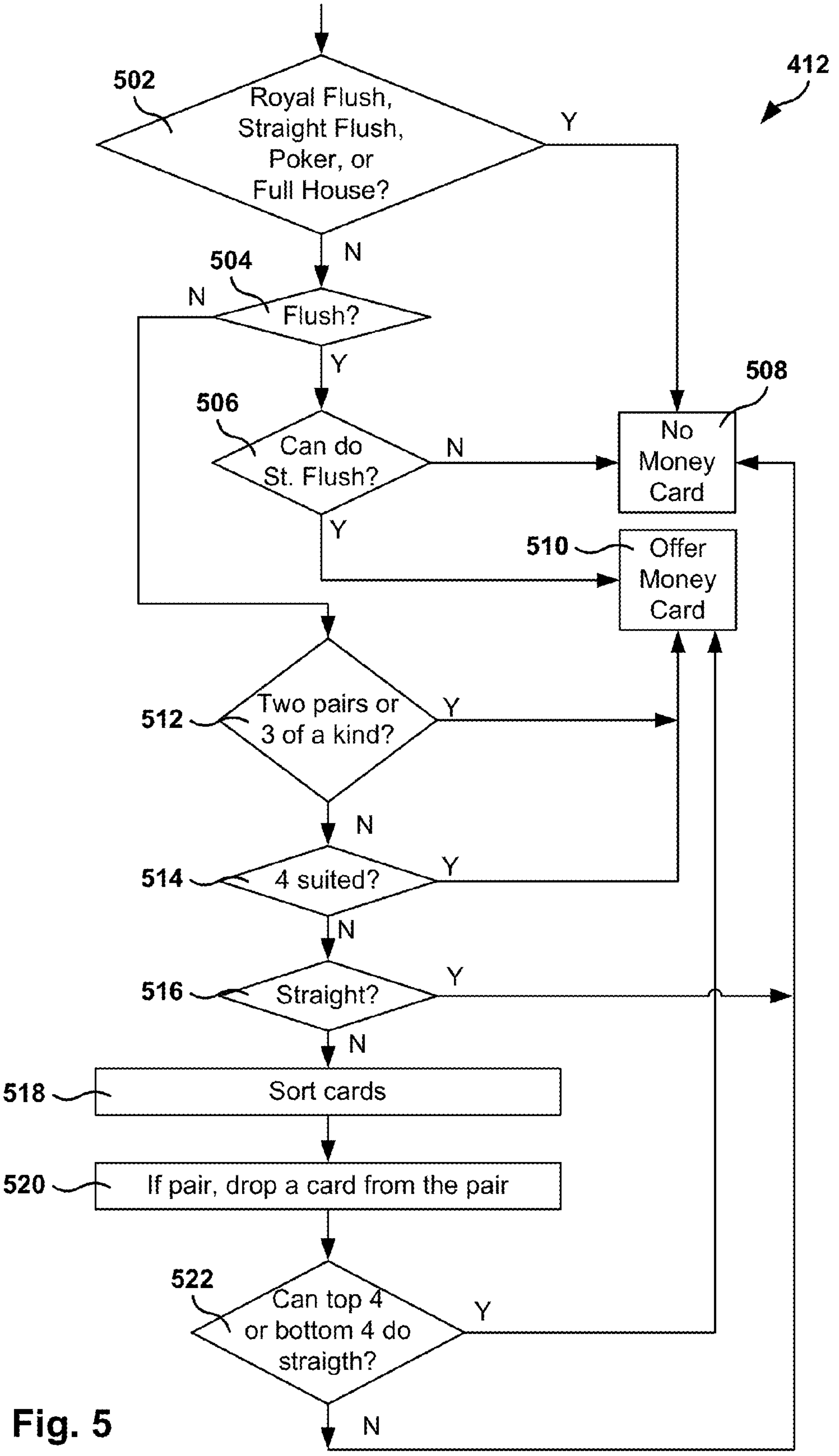
FIG. 5 is a flowchart illustrating an algorithm for determining whether to offer the money card, according to one embodiment.

FIG. 5 is a flowchart illustrating an algorithm for determining whether to offer the money card, according to one embodiment. While the various operations in this flowchart are presented and described sequentially, one of ordinary skill will appreciate that some or all of the operations may be executed in a different order, be combined or omitted, or be executed in parallel.

It is noted that operation 412 of FIG. 4 may be performed utilizing different methods. For example, in one embodiment, the determination of whether the hand is eligible to play for the money card is made using a hash table for the different possible hands. In addition, the rules for offering the money card may change in different embodiments. For example, the threshold hand may be different or the money card may be offered for more than one hand. Further, in some embodiments the money card is always offered when the player can improve to the threshold hand, however, in some embodiments the money card is not offered if the player has "a good hand" (e.g., a flush) as there is a possibility that the player would lose money if the player takes a chance with the money card and loses the winning combination that the player already has.

In operation 502, a check is made to determine if the player already has the winning hand that may not improve, or that would be unreasonable to try to risk the winnings already obtained. In one embodiment, if the player has a royal flush, a straight flush, a poker, or a full house, then the method flows to operation 508 and the money card is not offered. If the player does not have any of these poker hands, the method flows to operation 504 where a check is made to determine if the player has a flush.

If the player has a flush, in operation 506 a check is made to determine if the player can improve with the money card to a straight flush (including a royal flush). If the player cannot make the straight flush or the royal flush, it makes no sense to offer the money card because the player cannot improve, so no money card is offered. If the player can make the straight flush, the method flows to operation 510 where the option to play the money card is offered to the player.

In operation 512, a check is made to determine if the player has two pairs or 3 of a kind. Because these hands can improve to at least a full house, which is better than a straight, the method flows to operation 510 to offer the option to play the money card. If the player does not have two pairs or 3 of a kind, the method flows to operation 514 where a check is made to determine if the player has four cards of the same suit. If the player has four cards of the same suit, the player could improve to a flush, which is better than a straight, so the option to play the money card is offered.

In operation 516, a check is made to determine if the player has a straight, and if the player has a straight that the money card is offered. In one embodiment, checking for the straight could be performed in operation 502, but this would eliminate the option to get a straight flush or a royal flush. The player may want to risk the straight the player already has, because the winnings for a straight flush or a royal flush are much higher (see for example FIGS. 3A-3C).

If the player does not have a straight, then a check is made in operations 518, 520, and 522 to determine if the player could make a straight. There could be several ways to determine if the player can make the straight. In one embodiment, in operation 518 the cards are sorted in numerical order, where the Jack is assigned number 11, the Queen is assigned number 12, and the King is assigned number 13. In other embodiments, the cards are sorted according to a sorted list without requiring the assignment of numerical values.

From operation 518, the method flows to operation 520 where a check is made to determine if the player has a pair, and if the player has a pair one of the cards in the pair is dropped (e.g., taken out of consideration). In operation 522, a check is made to determine if the top 4 cards (according to the sorting order) or the bottom 4 cards can make a straight. If the straight cannot be made then the money card is not offered, and if that straight is possible then the money card is offered.

Figure 6:
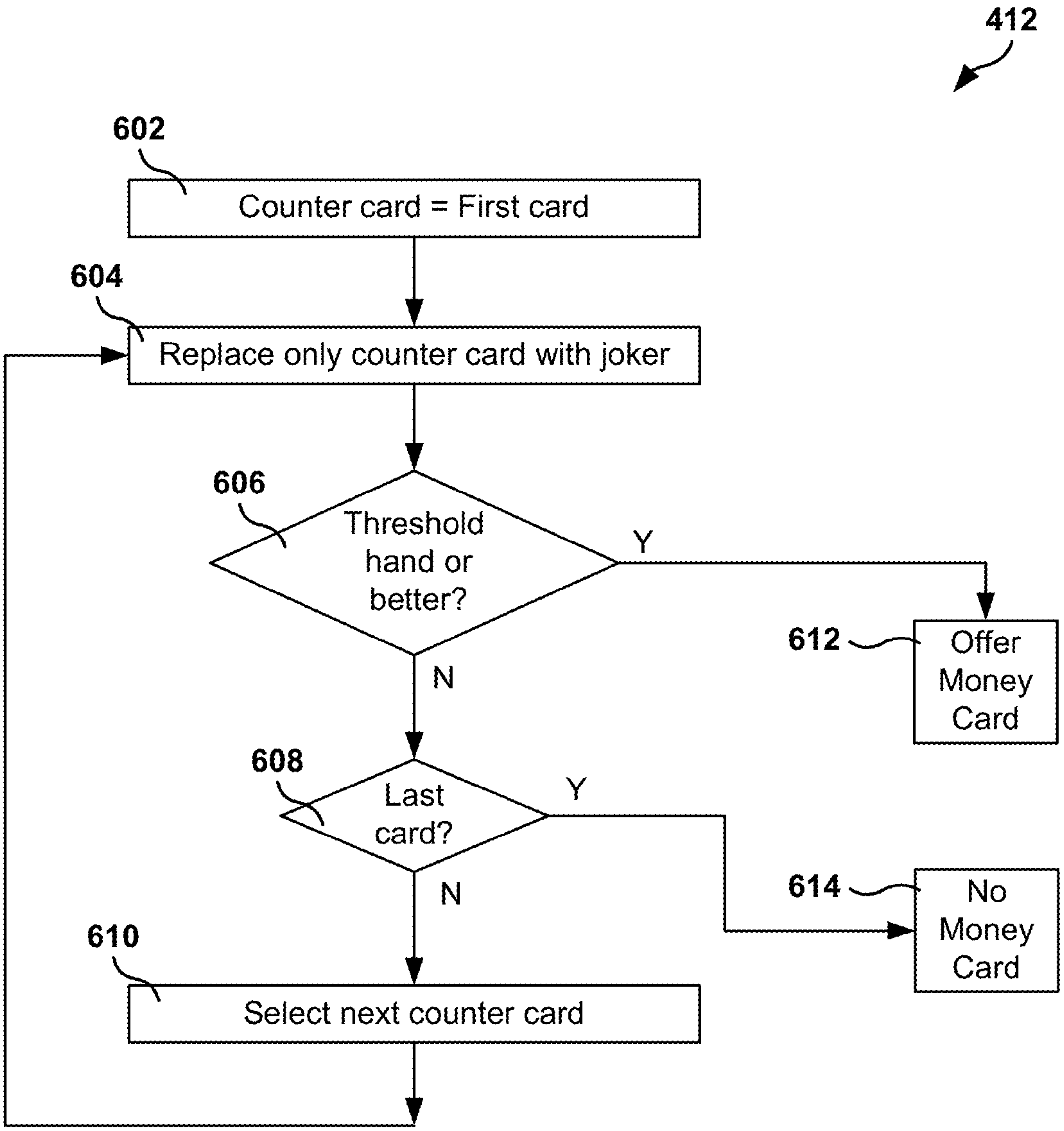
FIG. 6 is a flowchart illustrating a second algorithm for determining whether to offer the money card, according to one embodiment.

FIG. 6 is a flowchart illustrating a second algorithm for determining whether to offer the money card, according to one embodiment. While the various operations in this flowchart are presented and described sequentially, one of ordinary skill will appreciate that some or all of the operations may be executed in a different order, be combined or omitted, or be executed in parallel.

In the method of FIG. 6, there is an assumption that a method exists to determine the payout of a hand when wildcards are possible. The method of FIG. 6 replaces each of the cards in the player's hand with a wildcard to determine if a wildcard would produce a hand that is equal to, or better than, the threshold hand.

Therefore, in operation 602, a counter for the card being evaluated is set to be equal to the first card to be evaluated (e.g., the card on the left). From operation 602, the method flows to operation 604 where the counter card is replaced with a wildcard (e.g., a joker card).

From operation 604, the method flows to operation 606 where a check is made to determine if the hand with the wildcard is equal to, or better than, the threshold hand. If the threshold hand is beat, the method flows to operation 612 to offer the money card, and if the threshold hand is not beat, then the method flows to operation 608, where a check is made to determine if the last card has been checked for replacement with a wildcard.

If the counter card was not the last card, then the method flows to operation 610, and if the counter card was the last card then the money card is not offered. In operation 610, the next card is selected for replacement with the wildcard, and the method flows back to operation 604.

Figure 7:
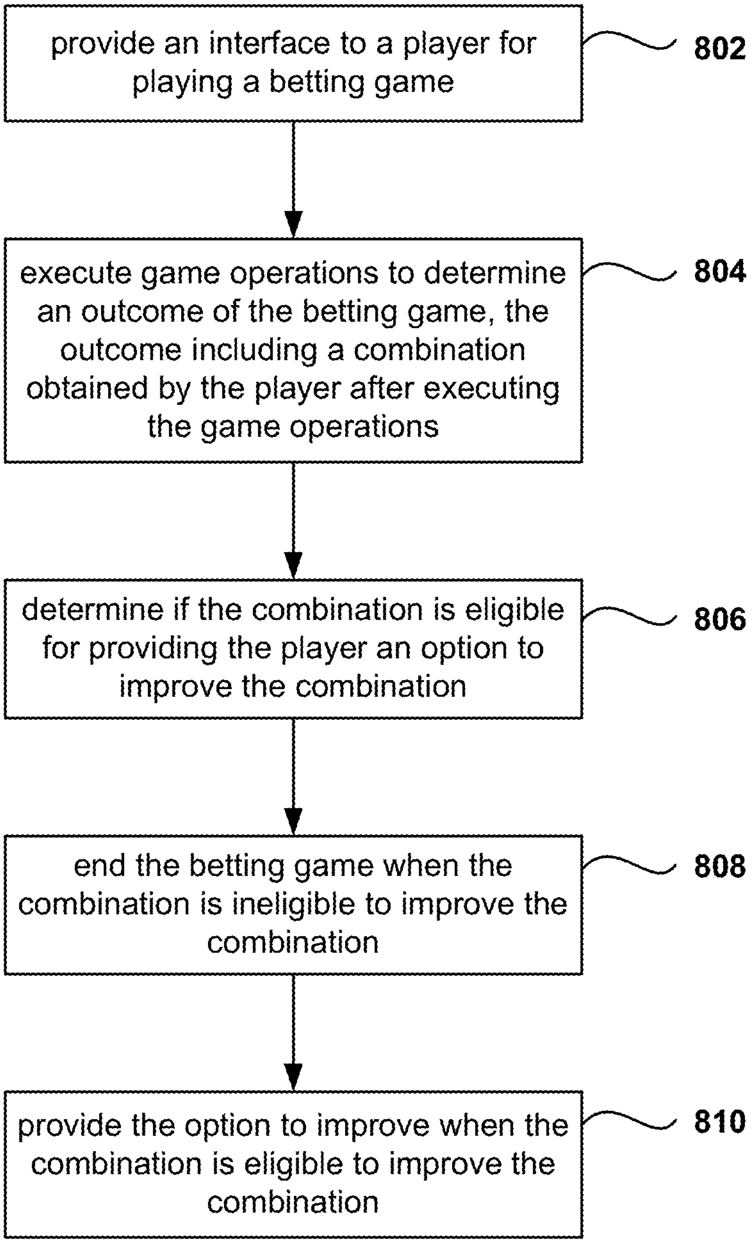
FIG. 7 is a flowchart illustrating an algorithm for providing an option to improve a player's hand for a fee, according to one embodiment.

FIG. 7 is a flowchart illustrating an algorithm for providing an option to improve a player's hand for a fee, according to one embodiment. While the various operations in this flowchart are presented and described sequentially, one of ordinary skill will appreciate that some or all of the operations may be executed in a different order, be combined or omitted, or be executed in parallel.

In operation 802, an interface is provided to a player for playing a betting game. From operation 802, the method flows to operation 804, where game operations are executed to determine an outcome of the betting game. The outcome includes a combination obtained by the player after executing the game operations.

From operation 804, the method flows to operation 806 for determining if the combination is eligible for providing the player an option to improve the combination. From operation 806, the method flows to operation 808 where the betting game is ended when the combination is ineligible to improve the combination.

Further, from operation 808, the method flows to operation 810, where the option to improve is provided when the combination is eligible to improve the combination, as determined in operation 806.

Figure 8:
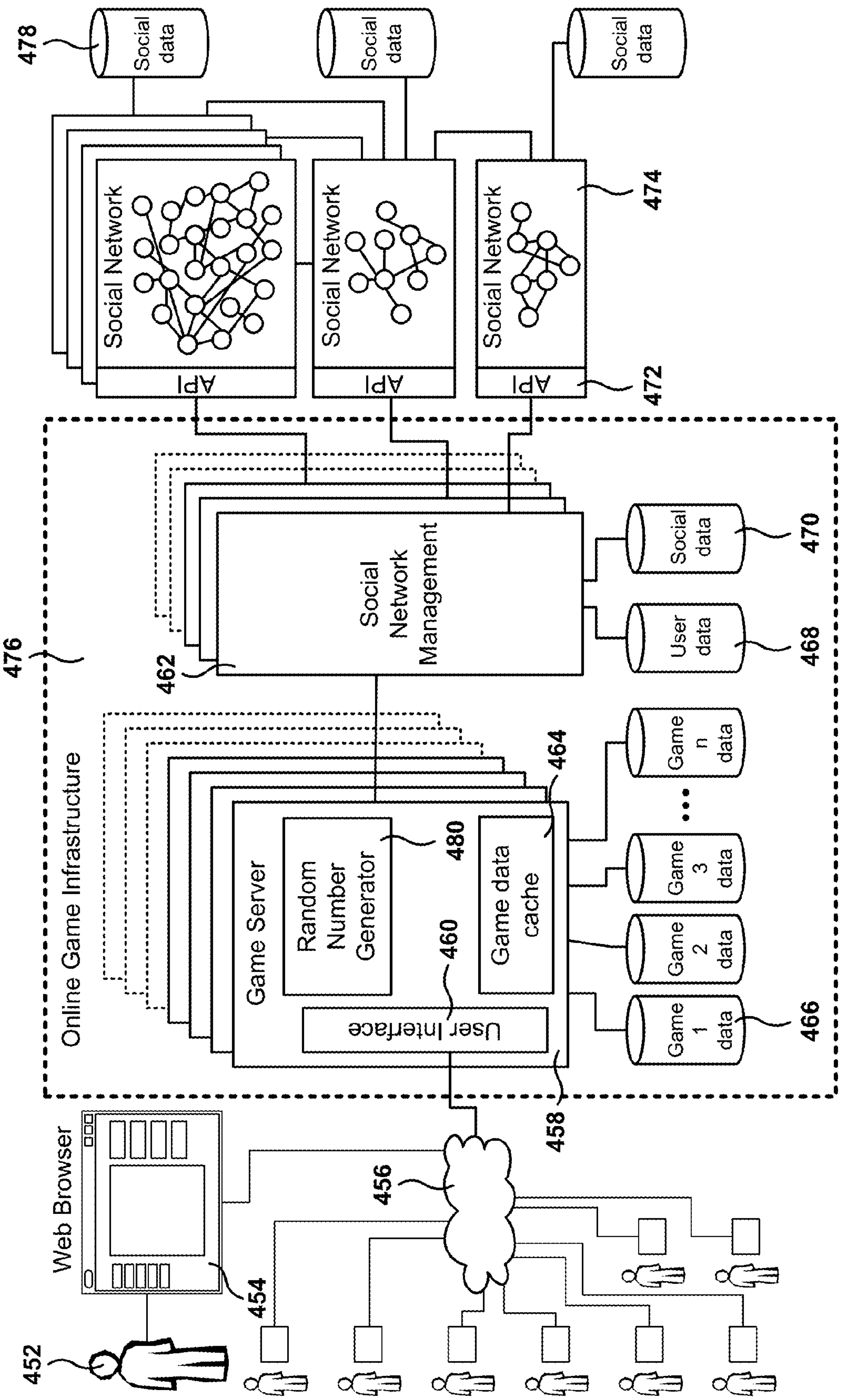
FIG. 8 illustrates an implementation of a Massively Multiplayer Online (MMO) infrastructure, according to one embodiment.

FIG. 8 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data and random number generator 480. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 8 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 8 should therefore not be interpreted to be exclusive or limiting, but rather exemplary or illustrative.

Figure 9:
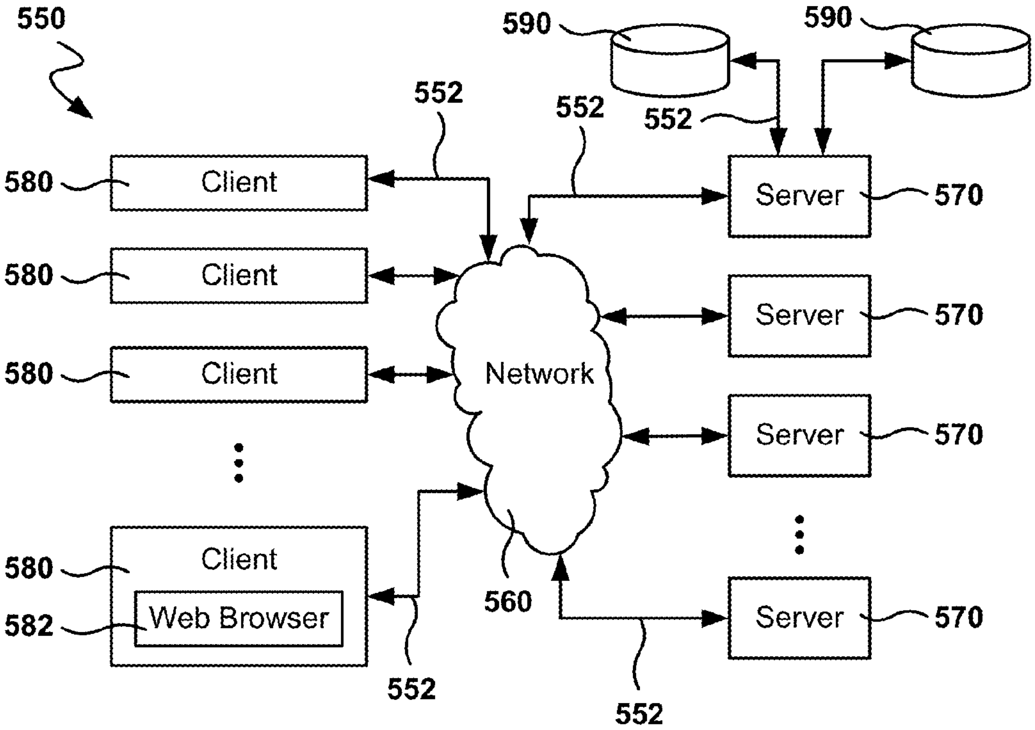
FIG. 9 illustrates an example network environment suitable for implementing embodiments.

FIG. 9 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 10:
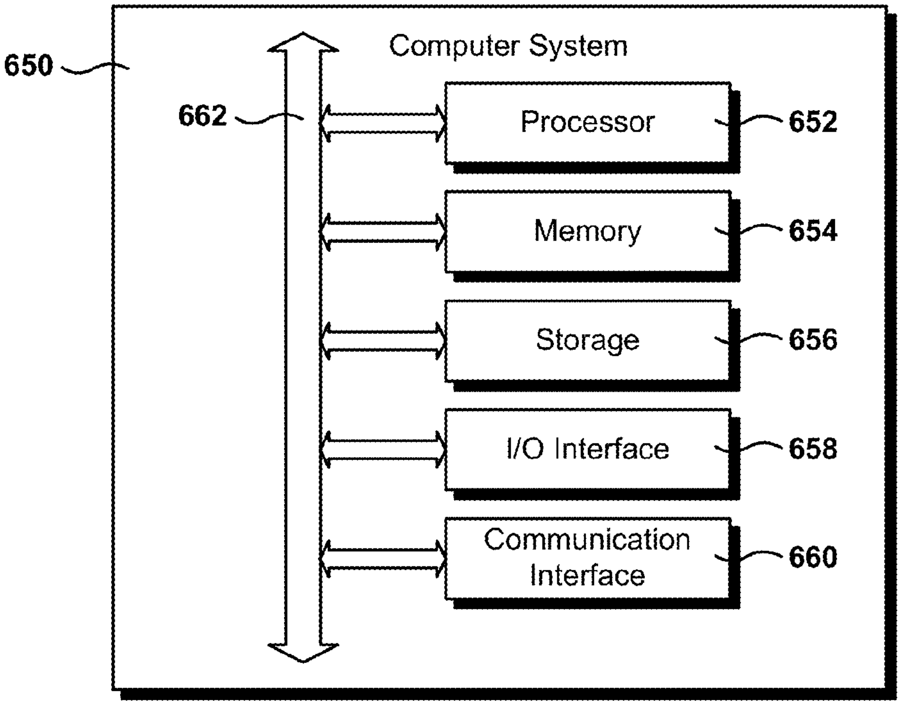
FIG. 10 illustrates an example computer system for implementing embodiments.

FIG. 10 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method comprising:

providing an interface to a player for playing a betting game, wherein the betting game is a cards game;

executing game operations to determine an outcome of the betting game, the outcome including a combination of plurality of cards obtained by the player after executing the game operations;

determining, using a hash table, if the combination is eligible for providing the player with an option to improve the combination, wherein the determining includes ascertaining that by changing one card in the combination, a modified combination can be obtained that is equal to or better than the combination or a threshold payout combination, wherein the hash table includes data identifying different combination of cards including combinations that need improvement and combinations that are eligible for payout;

ending the betting game when the combination is ineligible to be improved; and providing the option to improve when the combination is eligible to be improved, wherein operations of the method are implemented in an algorithm that is stored in a memory and executed by a processor of a server computing system and wherein the determining is made in accordance to pre-defined rules.

2. The method as recited in claim 1, wherein the interface includes an option for entering a bet, wherein the betting game is a cards game.

3. The method as recited in claim 1, wherein executing game operations further includes:

dealing cards;

providing an option to keep or discard each card;

dealing new cards for each discarded card;

determining the combination of the outcome based on the cards that were kept plus the dealt new cards; and identifying a value of the combination based on a payout table.

4. The method as recited in claim 1, wherein ending the betting game further includes:

determining if the outcome has a payout based on the combination and a payout table; and increasing a currency counter of an account of the player by the payout, if any.

5. The method as recited in claim 1, wherein providing the option to improve further includes:

providing an interface for selecting one card from one or more cards in the combination that needs to be replaced to improve the combination;

upon detecting the player selects the one card, charging a fee for changing the selected card; and dealing a new card to replace the selected card;

determining a payout for the combination based on a payout table; and ending the betting game.

6. The method as recited in claim 5, wherein charging the fee does not change an amount of the bet in the betting game.

7. The method of claim 1, wherein determining if the combination is eligible includes, replacing one card in the combination with a wildcard; and evaluating a new combination obtained by replacing the one card in the combination with the wildcard, wherein the betting game is a cards game, the option to improve provided when the new combination provides an improvement over the combination.

8. The method of claim 7, wherein evaluating a new combination further includes, using a counter to identify the one card in the combination that is being replaced with the wildcard, the counter incremented when a different card in the combination is being replaced to determine the new combination.

9. A method comprising:

providing an interface to a player for playing a video poker game;

dealing cards;

providing an option to keep or discard each card;

dealing a new card for each discarded card to obtain a card combination with the kept cards and one or more new cards;

determining, using a hash table, if the card combination is eligible for providing the player with an option to improve the card combination to a threshold payout combination or better, the hash table includes data identifying different combination of cards including combinations that need improvement and combinations that are eligible for payout;

ending the video poker game when the card combination is ineligible to be improved; and providing the option to improve when the card combination is eligible to be improved, wherein operations of the method are implemented in an algorithm that is stored in a memory and executed by a processor of a server computing system, wherein the algorithm determines eligibility in accordance to pre-defined rules.

10. The method as recited in claim 9, wherein determining if the card combination is eligible further includes:

ascertaining if by changing one card in the card combination, a modified combination could be obtained that is better than or equal to a threshold payout combination; and identifying the card combination as eligible or ineligible based on the ascertaining.

11. The method as recited in claim 10, wherein the threshold payout combination is one of three of a kind, a straight, a flush, a full house, four of a kind, a straight flush, or a royal flush.

12. The method as recited in claim 9, wherein ending the video poker game further includes:

determining if the card combination has a payout based on a payout table; and increasing a currency counter of an account of the player by the payout, if any.

13. The method as recited in claim 9, wherein providing the option to improve further includes:

providing an interface for selecting one card from one or more cards in the card combination that needs to be replaced to improve the card combination;

upon detecting the player selects the one card, charging a fee for changing the selected card; and dealing a new card to replace the selected card in the card combination;

determining a payout for the card combination based on a payout table; and ending the video poker game, wherein the fee charged is automatically deducted from a currency counter of an account of the player.

14. The method as recited in claim 13, wherein charging the fee does not change an amount of a bet in the video poker game.

15. The method as recited in claim 13, wherein providing the interface for selecting one card further includes:

highlighting which cards can be exchanged to improve the card combination, wherein the one card is selected from the cards that have been identified for exchange.

16. The method as recited in claim 13, wherein the fee is equal to a current bet in the video poker game.

17. The method as recited in claim 13, wherein the fee is based on a potential payout and a probability of the potential payout.

18. A non-transitory computer-readable storage medium storing a computer program, the computer-readable storage medium comprising:

program instructions for providing an interface to a player for playing a betting game, wherein the betting game is a cards game;

program instructions for executing game operations to determine an outcome of the betting game, the outcome including a combination of a plurality of cards obtained by the player after executing the game operations;

program instructions for determining, using a hash table, if the combination is eligible for providing the player with an option to improve the combination, wherein program instructions for determining includes program instructions for ascertaining that by changing the combination, a modified combination can be obtained that is equal to or better than a threshold payout combination, wherein the hash table includes data identifying different combination of cards including combinations that need improvement and combinations that are eligible for payout;

program instructions for ending the betting game when the combination is ineligible to be improved; and program instructions for providing the option to improve when the combination is eligible to be improved, wherein the determining is made in accordance to pre-defined rules.

19. The storage medium as recited in claim 18, wherein program instructions for providing the option to improve further includes:

program instructions for providing an interface for selecting one card from one or more cards in the combination that needs to be replaced to improve the combination;

upon detecting the player selects the one card, the program instructions for providing the option further includes, program instructions for charging a fee for changing the selected card; and program instructions for dealing a new card to replace the selected card;

program instructions for determining a payout for the combination based on a payout table; and program instructions for ending the betting game.

* * * * *